United States Patent [19]

Nakano et al.

[11] 4,433,465

[45] Feb. 28, 1984

[54] PROCESS FOR MANUFACTURING UNIVERSAL JOINT

[75] Inventors: Koji Nakano, Sagamihara; Kenji Katanaga, Yokohama, both of Japan

[73] Assignee: Aida Engineering, Ltd., Sagamihara, Japan

[21] Appl. No.: 352,873

[22] Filed: Feb. 26, 1982

[30] Foreign Application Priority Data

May 27, 1981 [JP] Japan .................................. 56-80580

[51] Int. Cl.$^3$ ...................... B23P 17/00; B23P 11/00; F16D 3/00
[52] U.S. Cl. ........................................ 29/415; 29/434; 403/57
[58] Field of Search .................... 403/57; 29/415, 434; 24/278, 279, 20 EE

[56] References Cited

U.S. PATENT DOCUMENTS

| | | | |
|---|---|---|---|
| 1,700,991 | 2/1929 | Wintercorn | 29/434 |
| 2,360,004 | 10/1944 | MacLean | 29/415 |
| 2,550,368 | 4/1951 | Michael | 403/57 |
| 2,550,625 | 4/1951 | Vick | 403/57 |
| 4,092,772 | 6/1978 | Moring | 29/434 |

*Primary Examiner*—Howard N. Goldberg
*Assistant Examiner*—Steven Nichols

*Attorney, Agent, or Firm*—Wenderoth, Lind & Ponack

[57] ABSTRACT

A process for manufacturing a universal joint which involves punching a blank out of a metal sheet material, the blank having a hub member portion, edge member portions on the opposite ends of the hub member portion, and a pair of prong portions projecting from one of the side edges of the hub member portion, with a neck portion therebetween, pressing the free edges of the edge member portions to form slanted surfaces on the ends thereof and to increase the width of the blank from the original punched out size and pressing the neck portion for removing fine cracks therefrom, and bending the edge member portions against the hub member portion with the slanted surfaces facing away from the surface of the hub member portion. Then the hub member portion is bent into a cylinder with the edge member portions abutting each other and projecting from the cylinder and with the slanted surfaces substantially aligned with the inner surface of the cylinder. Holes are bored in the prong member portions to receive a pin for a cross-arm, and the edge member portions are secured together. Thereafter the inner circumferential surface of the hub is splined. The blanks can be punched from the sheet material without any allowance being left between blanks or at the edges of the sheet material.

6 Claims, 15 Drawing Figures

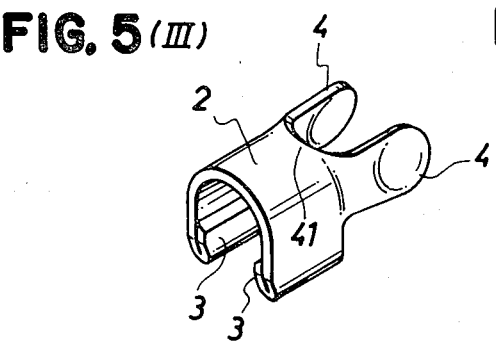
FIG. 5(III)

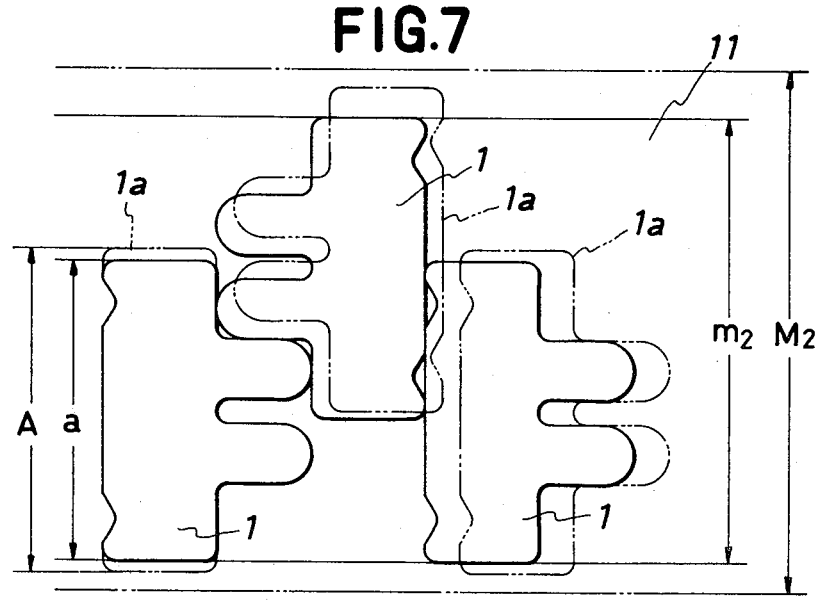
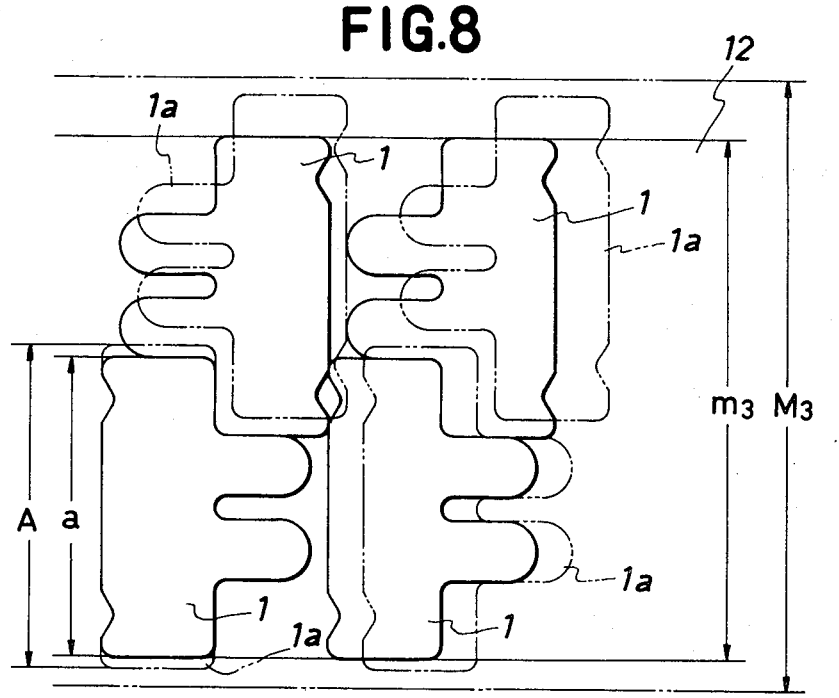

PROCESS FOR MANUFACTURING UNIVERSAL JOINT

The present invention relates to a process for manufacturing a universal joint by cold forging, and more particularly to a process for forming from a metal sheet a cylindrical hub to connect to a rotary driving shaft and a fork to connect to a cross-arm.

It has been known in the prior art to manufacture a universal joint from a metal blank by subjecting the same to several processing steps. The cylindrical hub thus formed is castellated inside to connect to a rotary driving shaft which is formed as a splined shaft. A cylindrical hub is formed from a blank in a manner such that both edges of the blank protrude from the cylinder and are clamped with a bolt in order to retain the cylindrical shape. Said edges of the blank are folded back in advance so that the protruding portion has a double in thickness for reinforcement. The folded edges are abutted so that the inside of the cylinder is completely castellated, see FIG. 9B.

However, in the above mentioned conventional method it is necessary to chamfer the edges of the blank which are folded where they project inside the cylinder so as to form a true circular cross-section. Otherwise, spline milling of the inside of the cylinder cannot be carried out and the yield of the material is thereby greatly reduced.

The configuration of the blank sheared from the sheet of raw material by press-punching is normally such that casting fins are formed at the upper portion of the shear plane, a fracture plane exists below said casting fin and another fin projects below the fracture plane. The said fracture plane has a rough surface and fine cracks therein. When used for a long period of time under constant load, such as a load to which a universal joint is subjected, the fine cracks become enlarged and cause unexpected breakage or damage. Since universal joints are vital parts for automobiles, they cannot be allowed to become broken while in use, and thus parts with such fine cracks therein are unacceptable.

Prongs integrally formed with the cylindrical hub are provided opposite each other to support a cross arm. The interval between the prongs of the finished product is 3 to 4 times greater than the interval between the prongs as cut in the blank. The prong members are therefore subjected to maximum elongation at their base when the blank is bent to form the universal joint, and the fine cracks in the fracture plane formed when the blank is punched out of the raw material often remain in the final product.

It has been necessary, therefore to check all the thus formed products individually and remove defective ones in the final steps of processing in order to prevent such products from being shipped out. However, this entails too much trouble and since it is difficult to prevent the fine cracks at the fork base in the conventional method, the incidence of defective products has been high.

It has been a common practice to provide an allowance of about 1.5 times the thickness of the material around the periphery of the blank in the direction of the feed of the material when punching blanks from a coiled sheet material. This has placed a limit on the yield even when punching blanks.

OBJECTS AND BRIEF SUMMARY OF THE INVENTION

Because of the defects as outlined above, it is an object of the present invention to provide a more efficient method for manufacturing universal joints.

Another object of the present invention is to provide a method of manufacturing universal joint which prevents production of defective products and radically improves the yield.

According to the present invention, the cylindrical hub is pressure formed in such a way that the edges will have a slanting face in cross-section and that the width of the blank is increased from its original size before being processed to form the hub. In this way, the yield of the material will improve because a blank of less width than that used in the conventional method can be used. Moreover, since the slanted side edges become integral with the cylindrical hub, there is no need to chamfer the edges, and the hub can be directly subjected to spline milling, eliminating one processing step.

The fork base in the blank punched out from the sheet material is pressed to repair any fine cracks formed on the fracture plane before bending the prong members, so as to leave no cracks or flaws in the final product.

By forming the slanted side edges on the blank and by pressing the base portion of the prongs before processing, fins, etc. which may occur at the time blanks are punched out and which may remain therein will not affect the final product. As a result, there will be no need to provide any allowance in the coiled sheet material either at the sides or in the feed direction thereof when punching out the blank.

A third object is to provide a method of manufacturing universal joints in which the material may be most effectively utilized.

BRIEF DESCRIPTON OF THE DRAWINGS

Other and further objects and effects of the invention will become apparent from the following detailed description of specific embodiments thereof in conjuction with the accompanying drawings in which:

FIG. 1 is a plan view of a blank to be processed according to the present invention;

FIG. 2(I) a cross-section of the edge of a blank to be bent to form the product wherein before processing, and FIG. 2(II) shows the edge of the blank after processing;

Figure 5I:
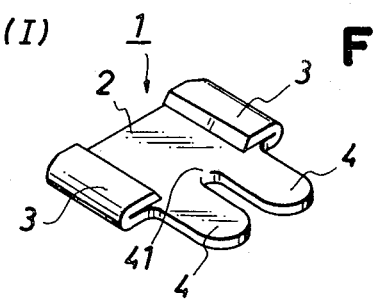
Figure 5:
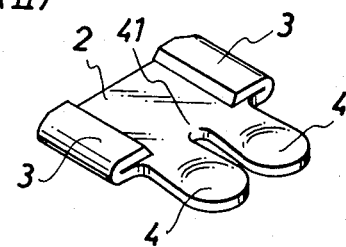
Figure 5:
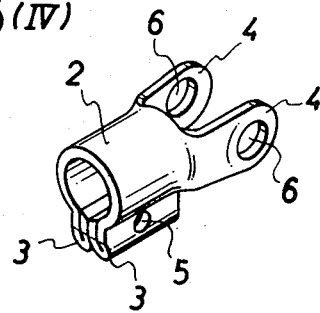
Figure 6:
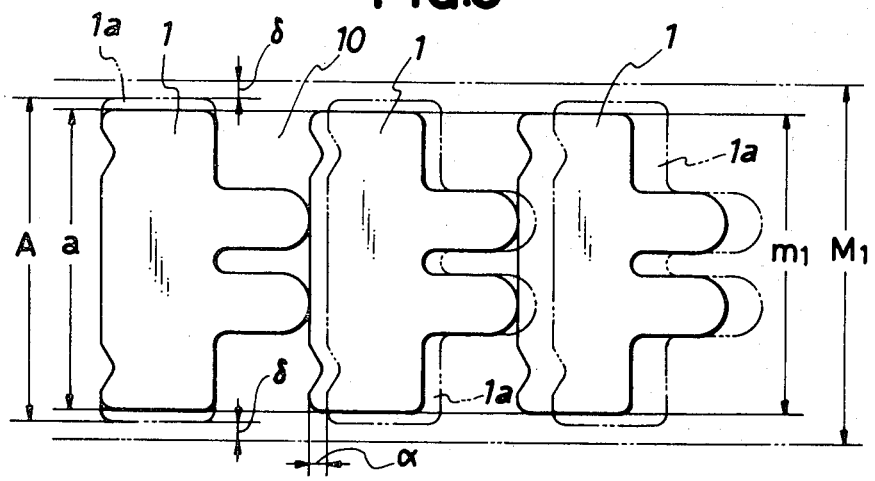
Figure 9:
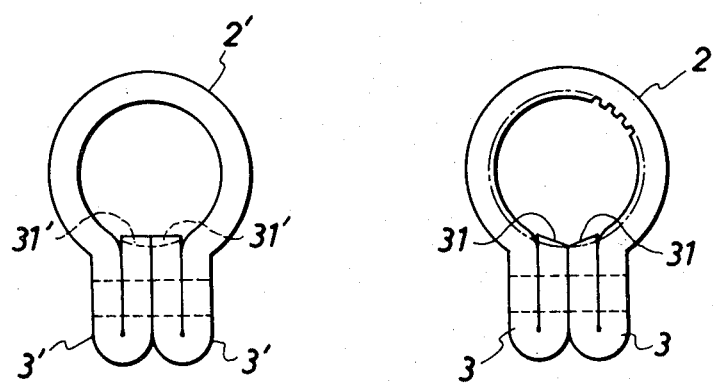

FIG. 5(I) through 5(IV) are perspective views showing the successive manufacturing steps of the method according to the present invention;

FIGS. 6 through 8 are layouts on the sheet material for the process of punching blanks from the sheet material, FIG. 6 showing the blanks to be punched arranged in a single row, FIG. 7 showing the blanks in a zig-zag arrangement, and FIG. 8 showing the blanks in a double row; and FIGS. 9A and 9B are front views of a hub according to the present invention and the prior art respectively.

DETAILED DESCRIPTION OF THE INVENTION

Figure 1:
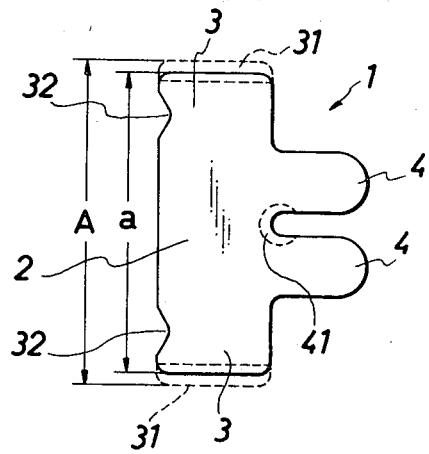
Figure 4:
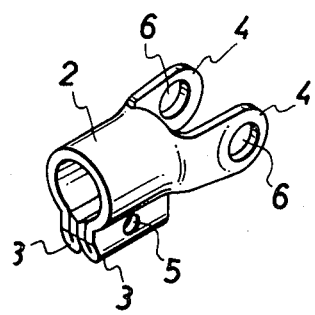
FIG. 4 is a perspective view of a universal joint formed by the method according to the present invention.

The present invention will now be described in further detail in connection with specific embodiments. In the Figures, reference numeral 1 denotes a metal blank, shown in FIG. 1, for forming into a universal joint as shown in FIG. 4 and which has been punched out of a sheet 11 of metal, such as a coiled sheet material, as shown in FIGS. 6–8. The blank comprises a hub member portion 2 which is formed into a cylindrical hub 2 in the final product, edge member portions 3 on both ends of said hub member portion 2 which are bent into edge members 3 in the final product, a pair of prong portions 4 extending parallel to the edge member portions from one of the side edges of the hub member portion and which form prongs 4 in the final product.

Figure 2I:
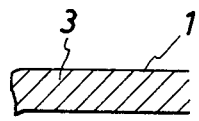
Figure 2:
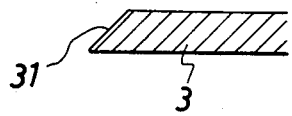

The dimension a between the edges of edge member portions 3 of the said blank 1 is made smaller than the corresponding dimension of a similar blank of the conventional type. The edge member portions 3, which have a cross-section as shown in FIG. 2(I) after they are punched are pressed to make faces of the free edges 31 slanted when viewed in cross-section, as shown in FIG. 2(II), thus increasing the distance between the edges to A. The dimension A corresponds to that of a conventional type blank. The edge member portions 3 are folded inwardly, or toward the hub member 2 with the slanted edge faces 31 facing outwardly during the forming of the cylindrical hub member. The slanted edges 31 will therefore be incorporated integrally in the cylindrical, and the said cylinder can be subjected to spline milling without the necessity of chamfering the edges 31.

FIGS. 9A and 9B show hub members for a universal joint according to the present invention and according to the prior art, respectively; the reference numerals for corresponding parts in the prior art joint are marked with a "'". As is clear from FIG. 9B, since the edge members 3' of the blank for forming the prior art joint are not chamfered, it is necessary to cut the edges of the blank after the blank has been bent into the cylinder to form the hub member before subjecting it to spline milling. On the other hand, as seen in FIG. 9A, the said cutting step can be omitted in the method of the present invention, since the chamfered edge surfaces 31 lie substantially along the inner periphery of the cylindrical hub member 2, and the yield will improve.

It is advisable to provide notches 32 in the edge of the blank on the opposite side from the prong portions at the end of the folding lines of the edge member portions 31 where they are bent toward the hub member 2 to prevent a thickness of material from protruding after the edge member portions are bent.

Figure 3I:
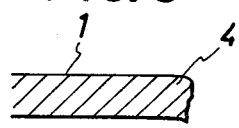
FIG. 3(I) is a cross-section of the blank at the neck of the form before processing and FIG. 3(II) shows the same part of the blank after processing.
Figure 3:
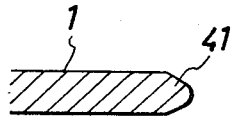

The neck portion 41 of the blank 1 between the prong members, which has a cross-sectional shape as shown in FIG. 3(I) after the blank is punched out, is pressed to compact the excess fin made at the time of punching out the blank and to flatten the neck portion of the shape shown in FIG. 3(II), thereby removing the fine cracks formed on the fracture plane. When the hub member portion 2 is shaped into the cylindrical shape and the prong members 4 are bent so as to face each other, there will be no cracks at the neck 41 between the prong members and the quality of the product will thereby be improved.

After the preliminary steps as described above, the edge member portions 3 are folded inwardly as shown in FIG. 5(I) with the slanted edges 31 facing away from the surface of the hub member portion 2. The prong members 4 are then dented and shaped so that the ends thereof are substantially circular as shown in FIG. 5(II). Then the hub member portion 2 is bent into a cylindrical shape as shown in FIGS. 5(III) and 5(IV) so that the said edge member portions 3 are abutting each other and project from the thus formed cylindrical hub member 2 as edge member 3. It will be seen that the slanted edge surfaces 31 are substantially aligned with the inner peripheral surface of the hub member 2.

The hub member 2 is finished and then spline milled so that a splined shaft, (either an input shaft or an output shaft) can be inserted therein. Holes 5 are bored through the edge members 3 for receiving a clamping bolt. Holes 6 are bored in the prongs 4 for inserting a pin to which a cross-arm can be connected.

The arrangement of blanks on the coiled sheet material from which the blanks are punched will now be described. In FIG. 6, blanks 1 are laid out in a single row on the material 10, the blanks being oriented in the same direction. Because of the manufacturing process as described above, allowances between blanks in the lengthwise direction of the sheet, i.e. in the direction in which it is fed toward the blank punching device, as well as on both edges can be reduced to zero. The blank 1 also has a smaller width than the prior art blank 1a. It will therefore be possible to use a coiled sheet material having a width $m_1$ which is smaller than the width $M_1$ of the conventional coiled sheet material 10a, whereby the material yield is improved.

FIG. 7 shows blanks laid out on a wider coiled sheet materail 11 in a zig-zag arrangement. In FIG. 8 the coiled sheet material 12 has a sufficient width for blanks to be arranged in double rows. The yield will then greatly improve. It will be easily understood that the material yield in the direction of the feed of the sheet material is greater in the present invention than for prior art blanks since the width of the coiled sheet material can be smaller than that of the conventional material M and since no allowance between blanks in the feed direction is necessary.

As described above, the fine cracks formed in the fracture plane at the neck between the prongs of the fork are pressed out before shaping of the hub and therefore damage due to the presence of such fine cracks is prevented.

The method of the present invention is characterized in that the portion which heretofore has been chamfered at the time of finishing is so shaped as to have a configuration corresponding to that of the final product by pressing the blank after the blank is punched out of the sheet material so that the width of the punched out blank can be less than that of a conventional blank. Moreover, since an allowance between blanks in the feed direction of the sheet material and on both edges is unnecessary the material yield is greatly improved.

What is claimed is:

1. A process for manufacturing a universal joint, comprising:
   punching a blank out of a metal sheet material, the blank having a hub member portion, edge member portions on the opposite ends of the hub member portion, and a pair of prong portions projecting from one of the side edges of the hub member portion;
   pressing the free edges of said edge member portions to form slanted surfaces on the ends thereof and to increase the width of the blank from the original punched out size;

bending said edge member portions against said hub member portion with said slanted surfaces facing away from the surface of said hub member portion;

bending said hub member portion into a cylinder with the edge member portions abutting each other and projecting from the cylinder and with said slanted surfaces substantially aligned with the inner surface of the cylinder;

boring holes in said prong member portions to receive a pin for a cross-arm; and securing the edge member portions together.

2. The process as claimed in claim 1 further comprising, prior to bending said edge member portions, making notches in the side edge of said blank opposite the side edge from which said prongs project and at the end of the fold line along which said edge member portions are bent.

3. A process for manufacturing a universal joint, comprising:

punching a blank out of a metal sheet material, the blank having a hub member portion, edge member portions on the opposite ends of the hub member portion, and a pair of prong portions projecting from one of the side edges of the hub member portion with a neck portion along said one side edge between said prongs;

pressing the neck portion for removing the fine cracks left in said neck portion when the blank is punched out;

bending said edge member portions against said hub member portion;

bending said hub member portion into a cylinder with the edge member portions abutting each other and projecting from the cylinder;

boring holes in said prong member portions to receive a pin for cross-arm; and securing the edge member portions together.

4. A process as claimed in claim 3 further comprising, prior to bending said edge member portions, shaping said prongs for making the free ends thereof substantially circular and indenting said ends.

5. A process for manufacturing a universal joint comprising:

laying out blanks on a metal sheet material, each blanking having a hub member portion, edge member portions on the opposite ends of the hub member portion, and a pair of prong portions projecting from one of the side edges of the hub member portion, the blanks being laid out with no allowances between adjacent blanks or between the blanks and the edges of the metal sheet material;

punching the blanks out of the metal sheet material;

pressing the free edges of said edge member portions of each blank to form slanted surfaces on the ends thereof and to increase the width of the blank from the original punched out size;

shaping said prongs on each blank for making the free ends thereof substantially circular;

bending said edge member portions of each blank against said hub member portion with said slanted surfaces facing away from the surface of said hub member portion;

bending said hub member portion of each blank into a cylinder with the edge member portions abutting each other and projecting from the cylinder and with said slanted surfaces substantially aligned with the inner surface of the cylinder;

boring holes in said prong member portions of each blank to receive a pin for a cross-arm; and securing the edge member portions of each blank together.

6. The process as claimed in claim 5 in which each said blank has a neck portion along said one side edge between said prongs, and said process further comprises, prior to bending said edge member portions, pressing the neck portion for removing the fine cracks left in said neck portion when the blank is punched out.

* * * * *